(12) United States Patent
Hou et al.

(10) Patent No.: US 10,520,146 B2
(45) Date of Patent: Dec. 31, 2019

(54) DOWNLIGHT APPARATUS

(71) Applicant: XIAMEN ECO LIGHTING CO. LTD., Xiamen (CN)

(72) Inventors: Shouqiang Hou, Xiamen (CN); Xiaoliang Wen, Xiamen (CN); Maojin Zeng, Xiamen (CN); Bin Yi, Xiamen (CN)

(73) Assignee: XIAMEN ECO LIGHTING CO. LTD., Xiamen (CN)

(*) Notice: Subject to any disclaimer, the term of this patent is extended or adjusted under 35 U.S.C. 154(b) by 0 days.

(21) Appl. No.: 16/161,020

(22) Filed: Oct. 15, 2018

(65) Prior Publication Data
US 2019/0128489 A1    May 2, 2019

(30) Foreign Application Priority Data

Oct. 27, 2017  (CN) .................... 2017 2 1406145 U

(51) Int. Cl.
| | | |
|---|---|---|
| *F21V 21/00* | (2006.01) | |
| *F21S 8/02* | (2006.01) | |
| *F21V 3/02* | (2006.01) | |
| *F21V 3/04* | (2018.01) | |
| *F21K 9/61* | (2016.01) | |
| *F21V 15/01* | (2006.01) | |
| *F21V 23/00* | (2015.01) | |
| *F21V 8/00* | (2006.01) | |
| *F21V 21/04* | (2006.01) | |
| *F21Y 115/10* | (2016.01) | |
| *F21Y 113/13* | (2016.01) | |
| *F21V 3/10* | (2018.01) | |
| *F21V 3/06* | (2018.01) | |
| *F21W 121/00* | (2006.01) | |

(52) U.S. Cl.
CPC .............. *F21S 8/026* (2013.01); *F21K 9/61* (2016.08); *F21V 3/02* (2013.01); *F21V 3/049* (2013.01); *F21V 15/01* (2013.01); *F21V 23/003* (2013.01); *G02B 6/0001* (2013.01); *F21V 3/0625* (2018.02); *F21V 3/10* (2018.02); *F21V 21/04* (2013.01); *F21W 2121/00* (2013.01); *F21Y 2113/13* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 9,239,142 B2* | 1/2016 | Quilici | ..................... F21S 8/04 |
| 2015/0241037 A1* | 8/2015 | Zhang | ..................... F21V 13/04 |
| | | | 362/308 |
| 2019/0120448 A1* | 4/2019 | Li | ........................... F21S 8/026 |

* cited by examiner

*Primary Examiner* — Vip Patel
(74) *Attorney, Agent, or Firm* — Chun-Ming Shih; Lanway IPR Services

(57) ABSTRACT

A downlight apparatus includes a main housing, a light module, a diffusion cover and a light guide. The main housing has a surrounding wall and a base part. The light module is attached to the base part for emitting a first light and a second light. The diffusion cover is fixed to a bottom end of the surrounding wall, for converting the second light to a peripheral light on an exterior surface of the diffusion cover. The light guide has a light entrance side facing to the base part for directing the first light through the light guide to escape at a light escape side of the light guide. The light escape side of the light guide is surrounded by diffusion cover.

20 Claims, 7 Drawing Sheets

DOWNLIGHT APPARATUS

FIELD OF INVENTION

The present invention is related to a downlight apparatus and more particularly related to a downlight apparatus with multiple light modules.

BACKGROUND

There are various lighting devices designed for satisfying different needs. For example, there are light bulbs to be installed on sockets. Such light bulbs are usually easy to be installed by users. For downlight devices used in normal home, it would be important to consider convenience for installation, safety and replacement.

Among light devices, downlight devices are popular. Various downlight devices may be in lots of places around the world. Usually, there is a cavity or an installation box in a ceiling. A downlight device is installed in the cavity or the installation box. Wires are connected to an external power source, like a 110V or 220V alternating current.

Sometimes, a control signal is also provided to the downlight device to control a luminance level of the downlight device.

SUMMARY OF INVENTION

According to an embodiment of the present invention, a downlight apparatus includes a main housing, a light module, a diffusion cover, and a light guide.

The downlight apparatus may be attached to a standard U.S. or European standard downlight station. The main housing may be made of plastic as a piece, e.g. made via a molding procedure to produce a one-piece component. Alternatively, the main housing may contain multiple parts to be assembled together or adding further components like driver circuit or heat sink.

The main housing has a surrounding wall and a base part. A top end of the surrounding wall fixed to the base part forming a cup containing space. For example, a surrounding wall is extended from the base part with a surrounding curved surface. The surrounding curved surface and the base part together form a cup containing space for enclosing some components mentioned below.

The light module may have one LED module or multiple LED modules. Where there are multiple LED modules, the multiple LED modules at different positions on a substrate or on different substrates. Some specific examples are explained as follows.

The light module is at least partly attached to the base part, meaning that at least some component of the LED module is directly or indirectly attached to the base part of the main housing. Specifically, as an example, when the main housing is made of plastic material, a metal heat sink may be disposed between the base part of the main housing and a LED plate of the light module.

In addition, the light module emits a first light and a second light. As mentioned above, the light module may have multiple LED modules for emitting the first light and the second light.

The diffusion cover is fixed to a bottom end of the surrounding wall for converting the second light to a peripheral light on an exterior surface of the diffusion cover. Furthermore, the light guide has a light entrance side facing to the base part for directing the first light through the light guide to escape at a light escape side of the light guide. In other words, there are two light output from the diffusion cover and the light guide respectively.

The light escape side of the light guide is surrounded by diffusion cover. The term "surround" does not need to limit the light escape side being at the same plane as the diffusion cover. Instead, the term "surround" refers that in a two-dimension protection aspect, the light escape side is surrounded by the diffusion cover. In other words, the light escape side may be higher than the diffusion cover while still being surrounded by the diffusion cover when being viewed from a two-dimension bottom view. The term "surround" is explained similarly for other components in this disclosure.

In some embodiments, the downlight apparatus further includes a driver. The driver controls the light module to emit the first light and the second light separately. In other words, the driver may be connected to a wire or wireless switch for users to manually control or for program codes to automatically control so as to turn on or turn off the first light and the second light separately. Specifically, the first light may be turned on while the second light is turned off, the first light may be turned off while the second light is turned on, or the first light and the second light are turned on at the same time. The luminance strength of the first light and the second light, when needed, may be tuned separately or with a predetermined relation, depending on different design needs.

In some embodiments, the light module has a first LED module and a second LED module for emitting the first light and the second light respectively. The first LED module and the second LED module may be disposed at different positions with different emitting directions. In some embodiments, the first LED module and the second LED module emit lights may even have different optical spectrums, e.g. with different color temperatures or colors.

In some embodiments, the light module may include a substrate, e.g. with aluminum material. The first LED module is disposed at a central portion of the substrate and the second LED module, which may include multiple sub-components, is disposed at a peripheral portion of the substrate. Specifically, the first LED module emits light to the light guide in the central position while the second LED module emits light to the diffusion cover to produce the peripheral light surrounding the light of the light guide.

In some other embodiments, the first LED module and the second LED module are mounted on two different substrates. The two different substrates are disposed at different heights with respect to the base part. Unlike the example mentioned above in which both the first LED module and the second LED module are dispose on the same substrate, the first LED module may be disposed on a substrate attached to the base part of the main housing, while the second LED module is disposed at a better position for rendering the peripheral light of the diffusion cover as requested.

For example, the second LED module may be positioned around the bottom end of the surrounding wall, with some wires for transmitting electricity to the second LED module along the surrounding wall. The second LED module now emits light more closely to the diffusion cover and may produce a better luminance efficacy.

The diffusion cover helps smooth output light, e.g. with roughened surface or coated with a translucent material for evenly guiding light to form a smooth effect. The diffusion cover may be a light guide plate when the light output points are carefully designed to create a light evenly distributed appearance.

In some embodiments, the diffusion cover may include a peripheral light guide. The second LED module emits the second light into the peripheral light guide to form the peripheral light. The peripheral light guide and the light guide mentioned above may be made of various material like PMMA while adding light output paths thereon to guide light to pass through the light guide and escape at multiple predetermined positions to create desired light effect.

In some embodiments, both sides of the peripheral light guide emit the peripheral light. In some other embodiments, the back side of the peripheral light guide is covered with a reflective cover so as the peripheral light only emits from one side of the peripheral light guide.

In some embodiments, the light guide is an elongated column, e.g. a cylinder, a polygonal column. The light escape side may further include a three-dimension shape for producing a corresponding three-dimension luminance effect. For example, a crown, torch, letter, wire shapes may be prepared on the light escape side of the light guide to produce a corresponding three-dimension shape of the light.

In some embodiments, the inner wall of the diffusion cover has a three-dimension surrounding inwardly curve surface. The inner wall refers to the surface facing toward the light guide in the middle of the downlight apparatus. The three-dimension surrounding inwardly curve surface is gradually extended downwardly from near the base part of the main housing to form a smooth shape. Some drawings in following disclosure explains more clearly such concept.

In some embodiments, the diffusion cover protrudes below the bottom end of the surrounding wall. Specifically, when the downlight apparatus is placed facing its light downwardly, the diffusion cover has a portion lower than the bottom end of the surrounding wall, thus forming a luminance ring.

In some embodiments, the three-dimension surrounding inwardly curve surface is corresponding to the surrounding wall so as luminance level over the diffusion cover is evenly distributed. Specifically, the surrounding wall may have a similar but different curve surface so as to reflect or to re-direct light to emit on the diffusion cover so as as luminance level over the diffusion cover is evenly distributed. Therefore, when the surrounding wall changes its curve shape, the diffusion cover is adjusted accordingly. This may be determined by using an optical analysis tool running on a computer, and then adjust the curve surface of the diffusion cover to achieve the evenly distributed effect.

In some embodiments, an interior side of the surrounding wall has reflective material for reflecting light evenly over the diffusion cover. For example, an additional reflective component or reflective material may be applied on the interior side of the surrounding wall. Alternatively, if the interior surface of the surrounding wall is made of plastic like white PC board, the reflective effect may sufficient fit the needs.

In some embodiments, luminance difference between any two positions of the diffusion cover is less than 30%. This means that the evenly distributed level may be controlled and adjusted by adjusting the curve surface and/or the reflective paths so that any two positions of the diffusion cover has similar luminance level, e.g. within 30% difference maximum.

In some embodiments, instead of having only one light guide, there may be multiple light guides in the middle of the downlight apparatus. The light escape sides of these light guides may direct to different directions to form a different visual effect, e.g. like a flower or a torch. These light guides may even have different colors, depending on different design needs.

In some embodiments, the base part has a back structure with two sockets for selectively installing different fixing structures for fixing the downlight apparatus to different stations. For example, in U.S. downlight standard, there are two elongated strips with their center disposed with a spring to adjusting an angle of the two elongated strips. In European downlight standards, there may be two elastic clips for hooking on a standard station.

The two sockets of the back structure may be fixed with different fixing structures like the elastic clips of European standard or elongated strips of U.S. standard, depending on where the products are sold to. In other words, such design ensures flexibility of the products, saving lots of manufacturing and storage cost.

DETAILED DESCRIPTION

Figure 1:
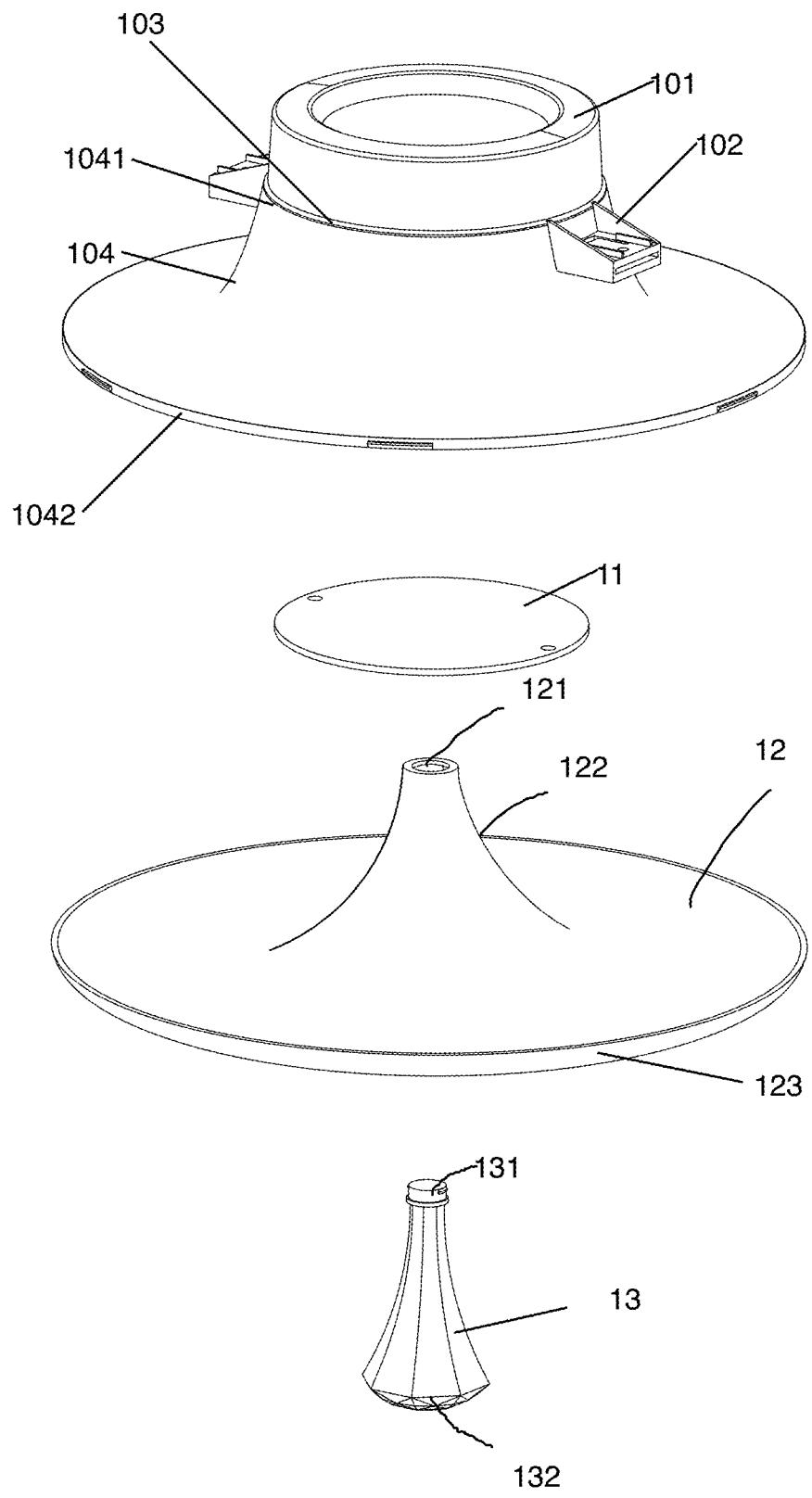
FIG. 1 is an exploded view showing components of a downlight apparatus embodiment.
Figure 2:
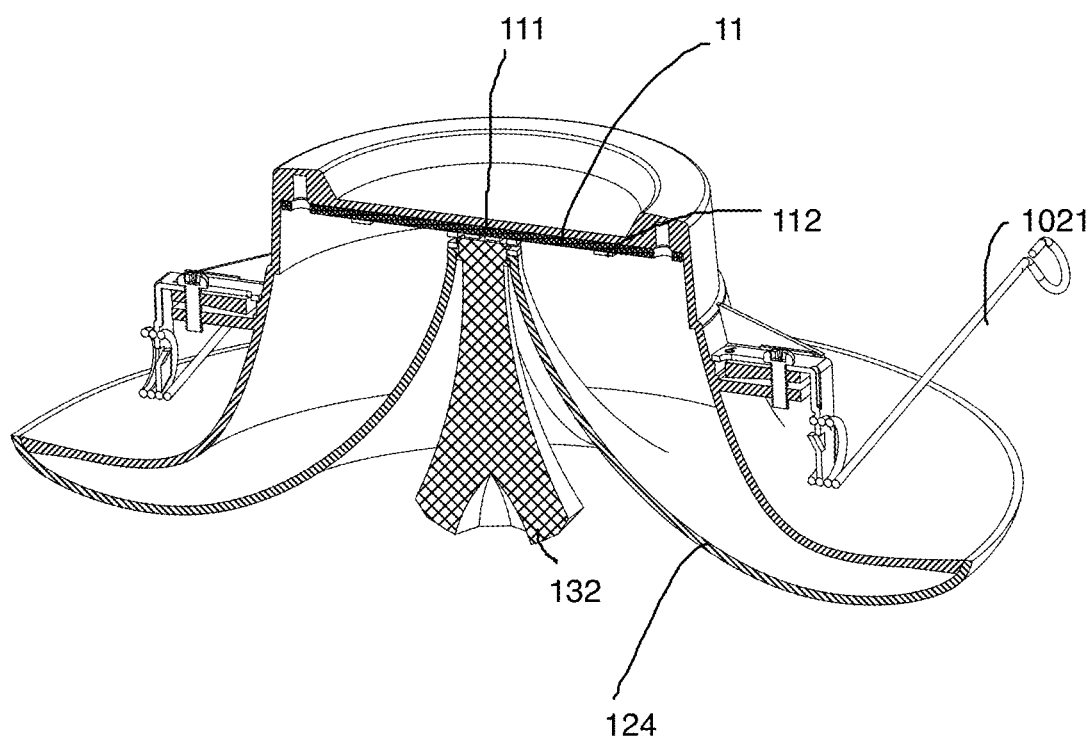
FIG. 2 is a sectional view showing component relation when the components of FIG. 1 are assembled.
Figure 3:
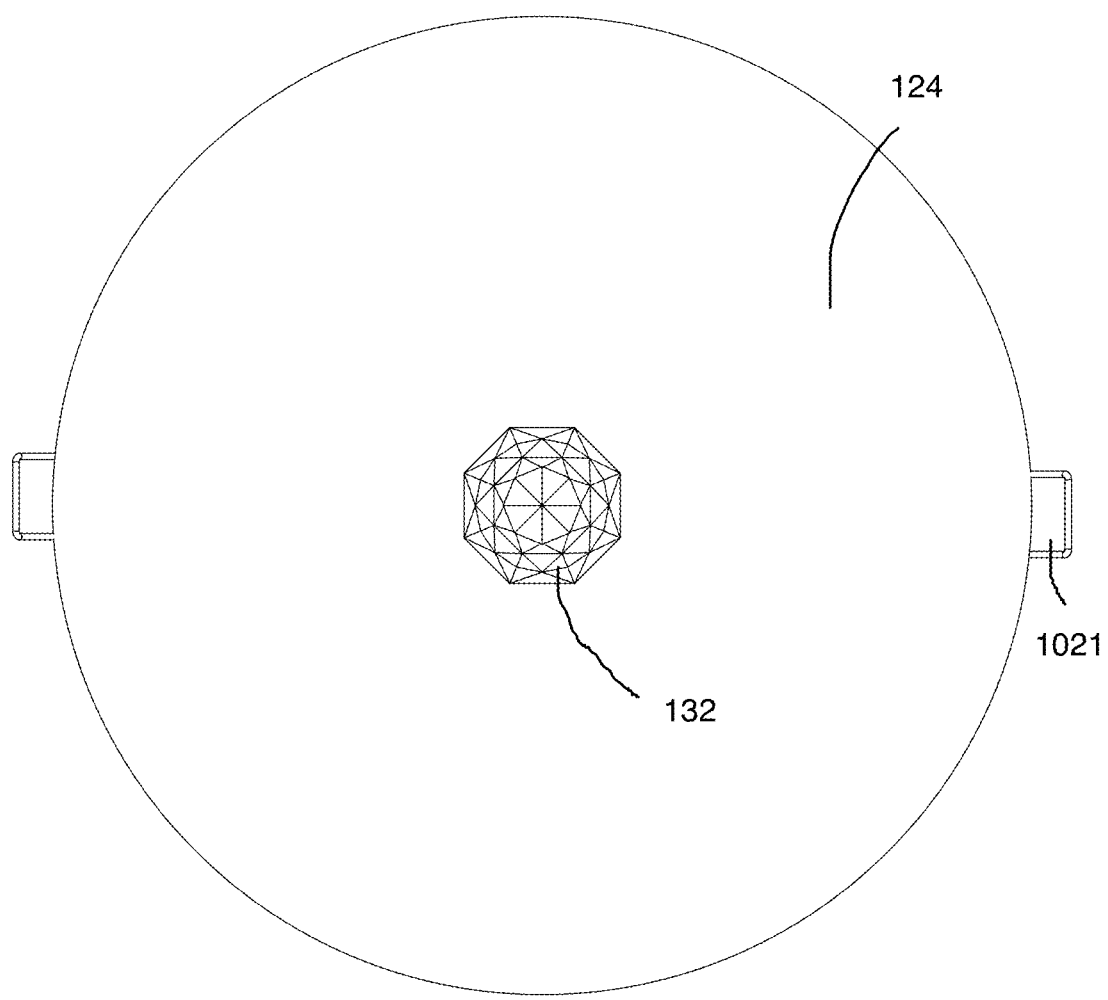
FIG. 3 shows a bottom looking upwardly to the embodiment of FIG. 1.

Please refer to FIG. 1, FIG. 2 and FIG. 3 together. FIG. 1 is an exploded view showing components of a downlight apparatus embodiment. FIG. 2 is a sectional view showing component relation when the components of FIG. 1 are assembled. FIG. 3 shows a bottom looking upwardly to the embodiment of FIG. 1.

In FIG. 1, FIG. 2 and FIG. 3, the downlight apparatus has a main housing that has a back structure 101, a base part 103 and a surrounding wall 104. The back structure 101 has two sockets for installing different fixing structures 1021 corresponding to different stations.

The surrounding wall has a top end 1041 fixed to the base part 103 and a bottom end 1042 fixed to a diffusion cover 12.

In this example, a light module 11 includes a substrate mounted with a first LED module 111 and a second LED module 112. The first LED module 111 is disposed at center portion of the substrate while the second LED module is disposed at peripheral portion of the substrate.

There is a light guide 13 disposed at center of the downlight apparatus, surrounding by the diffusion cover 12 and the surrounding wall 104. The first LED module 111 emits a first light into the light guide 13 from a light entrance side 131. The light passes through the light guide 13 and emits from the light escape side 132 of the light guide. A three-dimension shape is formed at the light escape side 132, e.g. a crown shape, for rendering a three-dimension visual effect.

The diffusion cover 12 is fixed to the bottom end 1042 of the surrounding wall 104. The diffusion cover 112 converts a second light from the second LED module 112 to a peripheral light emitting from the exterior surface 124 of the diffusion cover. The light effect of the diffusion cover 12 is smooth, to form a charming effect together with the light guide 13. The lateral side of the diffusion cover 12 has a three-dimension surrounding inwardly curve surface 122, corresponding to the three-dimension curve surface of the surrounding wall 104. The interior side of the surrounding wall helps reflect and guide the second light to smoothly emit on the diffusion cover 12.

Figure 4:
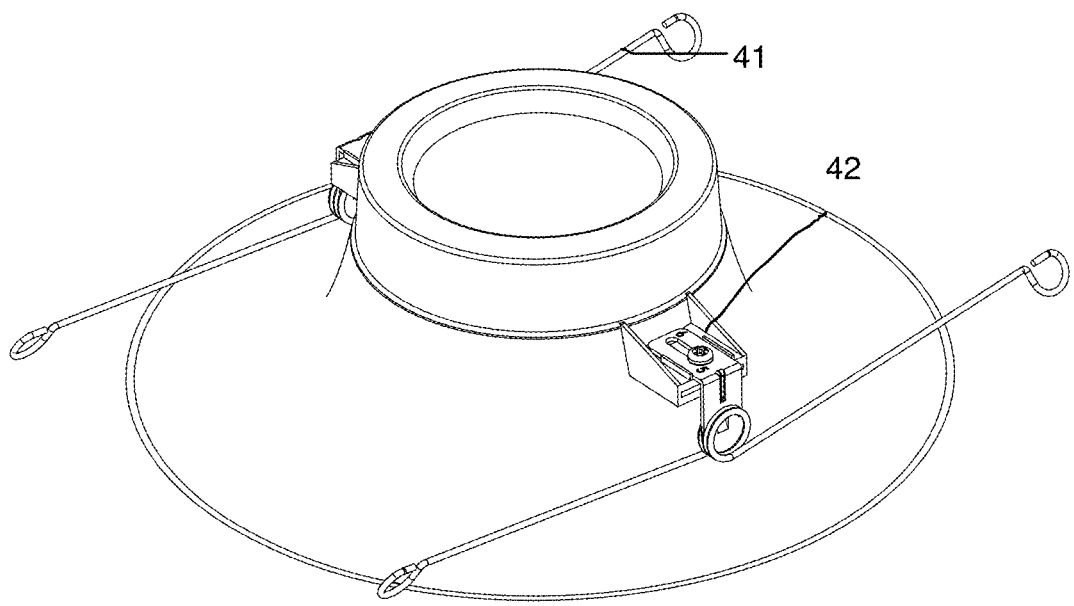
FIG. 4 shows a first fixing structure for a U.S. downlight station.

Please refer to FIG. 4, which illustrates the socket 42 may be attached to an elongated strip 41 for U.S. downlight standard.

Figure 5:
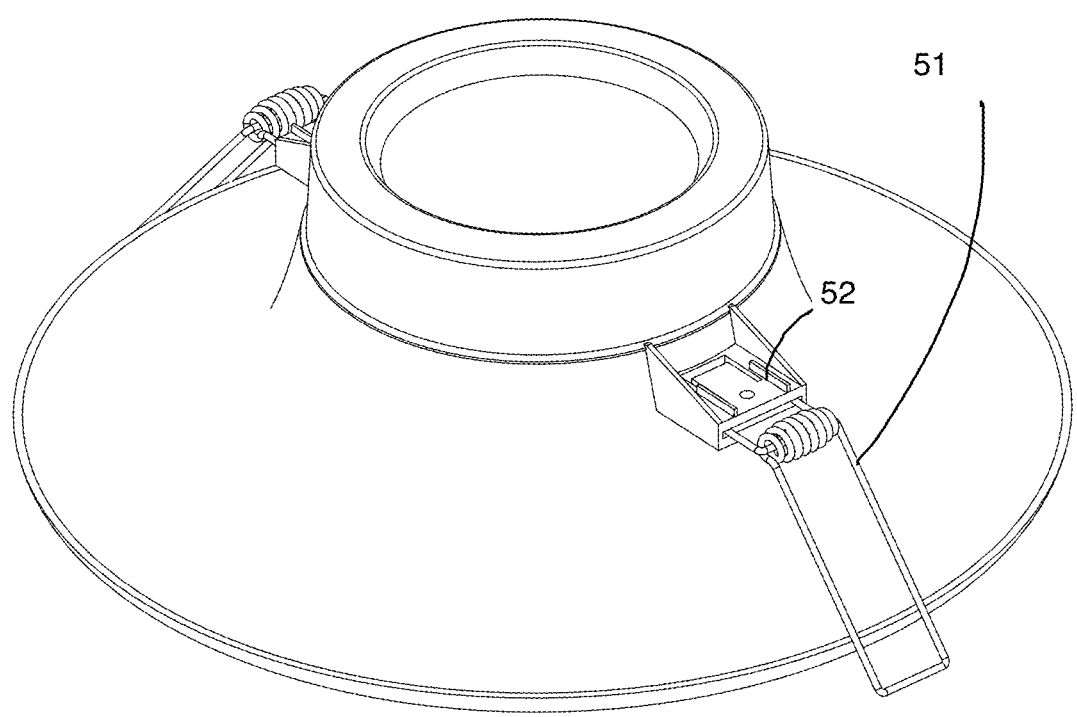
FIG. 5 shows a second fixing structure for a European downlight station.

Please refer to FIG. 5, which illustrates the same socket 52 may be attached to an elastic clip for European standard.

According to an embodiment of the present invention, a downlight apparatus includes a main housing, a light module, a diffusion cover, and a light guide.

The downlight apparatus may be attached to a standard U.S. or European standard downlight station. The main housing may be made of plastic as a piece, e.g. made via a molding procedure to produce a one-piece component. Alternatively, the main housing may contain multiple parts to be assembled together or adding further components like driver circuit or heat sink.

The main housing has a surrounding wall and a base part. A top end of the surrounding wall fixed to the base part forming a cup containing space. For example, a surrounding wall is extended from the base part with a surrounding curved surface. The surrounding curved surface and the base part together form a cup containing space for enclosing some components mentioned below.

The light module may have one LED module or multiple LED modules. Where there are multiple LED modules, the multiple LED modules at different positions on a substrate or on different substrates. Some specific examples are explained as follows.

The light module is at least partly attached to the base part, meaning that at least some component of the LED module is directly or indirectly attached to the base part of the main housing. Specifically, as an example, when the main housing is made of plastic material, a metal heat sink may be disposed between the base part of the main housing and a LED plate of the light module.

In addition, the light module emits a first light and a second light. As mentioned above, the light module may have multiple LED modules for emitting the first light and the second light.

The diffusion cover is fixed to a bottom end of the surrounding wall for converting the second light to a peripheral light on an exterior surface of the diffusion cover. Furthermore, the light guide has a light entrance side facing to the base part for directing the first light through the light guide to escape at a light escape side of the light guide. In other words, there are two light output from the diffusion cover and the light guide respectively.

The light escape side of the light guide is surrounded by diffusion cover. The term "surround" does not need to limit the light escape side being at the same plane as the diffusion cover. Instead, the term "surround" refers that in a two-dimension protection aspect, the light escape side is surrounded by the diffusion cover. In other words, the light escape side may be higher than the diffusion cover while still being surrounded by the diffusion cover when being viewed from a two-dimension bottom view. The term "surround" is explained similarly for other components in this disclosure.

In some embodiments, the downlight apparatus further includes a driver. The driver controls the light module to emit the first light and the second light separately. In other words, the driver may be connected to a wire or wireless switch for users to manually control or for program codes to automatically control so as to turn on or turn off the first light and the second light separately. Specifically, the first light may be turned on while the second light is turned off, the first light may be turned off while the second light is turned on, or the first light and the second light are turned on at the same time. The luminance strength of the first light and the second light, when needed, may be tuned separately or with a predetermined relation, depending on different design needs.

In some embodiments, the light module has a first LED module and a second LED module for emitting the first light and the second light respectively. The first LED module and the second LED module may be disposed at different positions with different emitting directions. In some embodiments, the first LED module and the second LED module emit lights may even have different optical spectrums, e.g. with different color temperatures or colors.

In some embodiments, the light module may include a substrate, e.g. with aluminum material. The first LED module is disposed at a central portion of the substrate and the second LED module, which may include multiple subcomponents, is disposed at a peripheral portion of the substrate. Specifically, the first LED module emits light to the light guide in the central position while the second LED module emits light to the diffusion cover to produce the peripheral light surrounding the light of the light guide.

In some other embodiments, the first LED module and the second LED module are mounted on two different substrates. The two different substrates are disposed at different heights with respect to the base part. Unlike the example mentioned above in which both the first LED module and the second LED module are dispose on the same substrate, the first LED module may be disposed on a substrate attached to the base part of the main housing, while the second LED module is disposed at a better position for rendering the peripheral light of the diffusion cover as requested.

For example, the second LED module may be positioned around the bottom end of the surrounding wall, with some wires for transmitting electricity to the second LED module along the surrounding wall. The second LED module now emits light more closely to the diffusion cover and may produce a better luminance efficacy.

The diffusion cover helps smooth output light, e.g. with roughened surface or coated with a translucent material for evenly guiding light to form a smooth effect. The diffusion cover may be a light guide plate when the light output points are carefully designed to create a light evenly distributed appearance.

In some embodiments, the diffusion cover may include a peripheral light guide. The second LED module emits the second light into the peripheral light guide to form the peripheral light. The peripheral light guide and the light guide mentioned above may be made of various material like PMMA while adding light output paths thereon to guide light to pass through the light guide and escape at multiple predetermined positions to create desired light effect.

In some embodiments, both sides of the peripheral light guide emit the peripheral light. In some other embodiments, the back side of the peripheral light guide is covered with a reflective cover so as the peripheral light only emits from one side of the peripheral light guide.

In some embodiments, the light guide is an elongated column, e.g. a cylinder, a polygonal column. The light escape side may further include a three-dimension shape for producing a corresponding three-dimension luminance effect. For example, a crown, torch, letter, wire shapes may be prepared on the light escape side of the light guide to produce a corresponding three-dimension shape of the light.

In some embodiments, the inner wall of the diffusion cover has a three-dimension surrounding inwardly curve surface. The inner wall refers to the surface facing toward the light guide in the middle of the downlight apparatus. The three-dimension surrounding inwardly curve surface is gradually extended downwardly from near the base part of the main housing to form a smooth shape. Some drawings in following disclosure explains more clearly such concept.

In some embodiments, the diffusion cover protrudes below the bottom end of the surrounding wall. Specifically, when the downlight apparatus is placed facing its light downwardly, the diffusion cover has a portion lower than the bottom end of the surrounding wall, thus forming a luminance ring.

In some embodiments, the three-dimension surrounding inwardly curve surface is corresponding to the surrounding wall so as luminance level over the diffusion cover is evenly distributed. Specifically, the surrounding wall may have a similar but different curve surface so as to reflect or to re-direct light to emit on the diffusion cover so as as luminance level over the diffusion cover is evenly distributed. Therefore, when the surrounding wall changes its curve shape, the diffusion cover is adjusted accordingly. This may be determined by using an optical analysis tool running on a computer, and then adjust the curve surface of the diffusion cover to achieve the evenly distributed effect.

In some embodiments, an interior side of the surrounding wall has reflective material for reflecting light evenly over the diffusion cover. For example, an additional reflective component or reflective material may be applied on the interior side of the surrounding wall. Alternatively, if the interior surface of the surrounding wall is made of plastic like white PC board, the reflective effect may sufficient fit the needs.

In some embodiments, luminance difference between any two positions of the diffusion cover is less than 30%. This means that the evenly distributed level may be controlled and adjusted by adjusting the curve surface and/or the reflective paths so that any two positions of the diffusion cover has similar luminance level, e.g. within 30% difference maximum.

In some embodiments, instead of having only one light guide, there may be multiple light guides in the middle of the downlight apparatus. The light escape sides of these light guides may direct to different directions to form a different visual effect, e.g. like a flower or a torch. These light guides may even have different colors, depending on different design needs.

In some embodiments, the base part has a back structure with two sockets for selectively installing different fixing structures for fixing the downlight apparatus to different stations. For example, in U.S. downlight standard, there are two elongated strips with their center disposed with a spring to adjusting an angle of the two elongated strips. In European downlight standards, there may be two elastic clips for hooking on a standard station.

The two sockets of the back structure may be fixed with different fixing structures like the elastic clips of European standard or elongated strips of U.S. standard, depending on where the products are sold to. In other words, such design ensures flexibility of the products, saving lots of manufacturing and storage cost.

Figure 6:
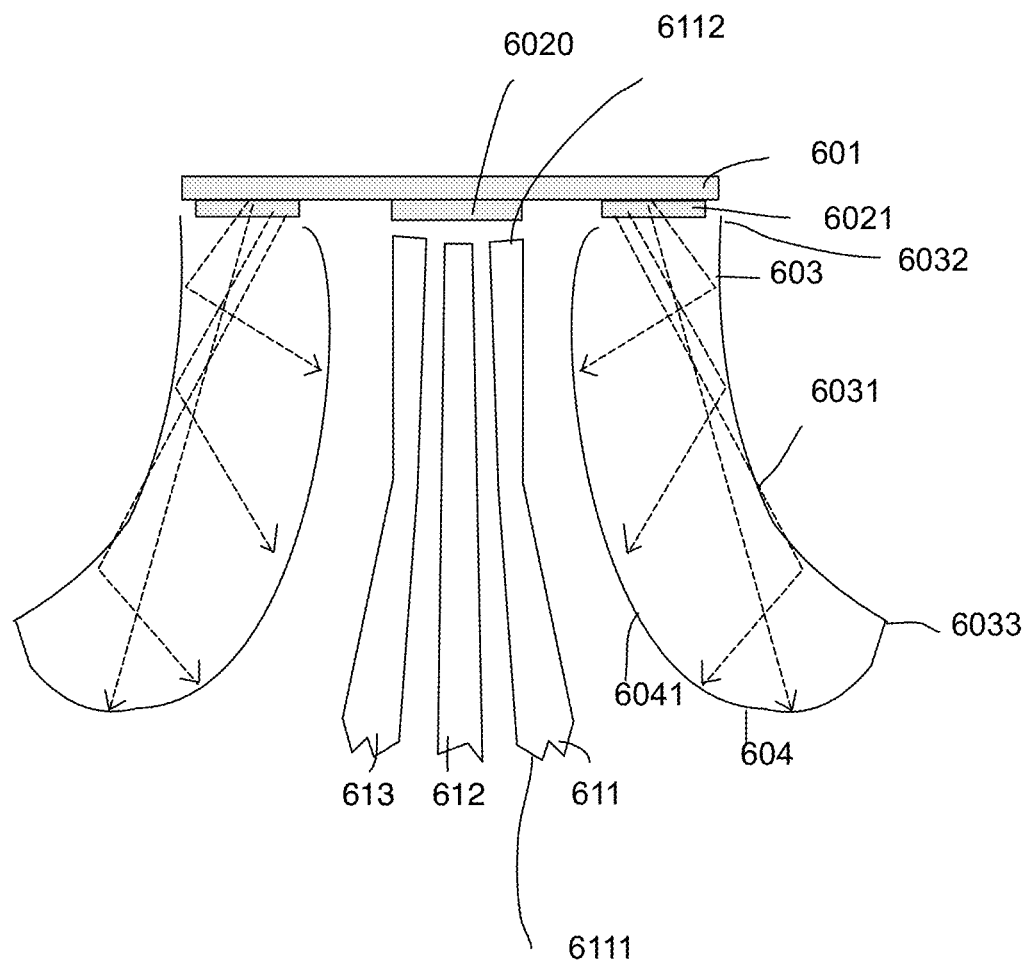
FIG. 6 shows component relation in another embodiment.

Please refer to FIG. 6. FIG. 6 is used for explaining several concepts of the features mentioned above.

Similar to the examples mentioned above, the downlight apparatus has a base part 601, a surrounding wall 603, a first LED module 6020, a second LED module 6021, a diffusion cover 604.

The diffusion cover 604 is fixed to the bottom end 6033 of the surrounding wall 603. The base part 601 is fixed to a top end 6032 of the surrounding wall 603. There is a protruding portion of the diffusion cover 604 below the bottom end 6033 of the surrounding wall 603. The light guide 611 has a light entrance side 6112 and a light escape side 6111.

Some features are further explained as follows.

First, there may be multiple light guides 611, 612, and 613, which may be curved and emits light to different directions.

Second, the three-dimension surrounding inwardly curve surface 6041 of the diffusion cover 604 may be adjusted according to a curved surface 6031 of a different surrounding wall 603 so that the light may be evenly distributed and appear on interior surface of the diffusion cover 604.

Figure 7:
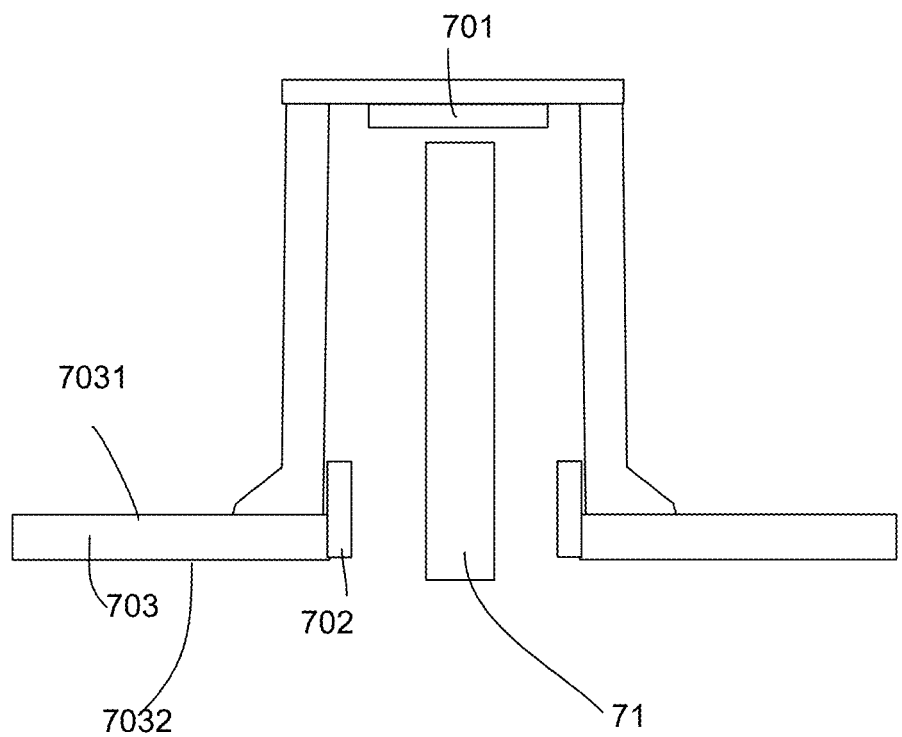
FIG. 7 shows another embodiment of a downlight apparatus.

Please refer to FIG. 7, which illustrates another embodiment.

In FIG. 7, the first LED module 701 emits a first light to the light guide 71. There is a second LED module 702 disposed at different substrates as the first LED module 701 for emitting light into a peripheral light guide 703, which is like a disk with hole in central position. The front side 7032 and the back side 7031 of the peripheral light guide may emit the peripheral light. Alternatively, the back side of the peripheral light guide may be attached with a reflective component to reflect light so as the peripheral light is emitted only from the front side 7032 of the peripheral light guide.

In addition to the above-described embodiments, various modifications may be made, and as long as it is within the spirit of the same invention, the various designs that can be made by those skilled in the art are belong to the scope of the present invention.

The invention claimed is:

1. A downlight apparatus, comprising:
    a main housing having a surrounding wall and a base part, a top end of the surrounding wall fixed to the base part forming a cup containing space;
    a light module at least partly attached to the base part for emitting a first light and a second light;
    a diffusion cover fixed to a bottom end of the surrounding wall, for converting the second light to a peripheral light on an exterior surface of the diffusion cover;
    a light guide having a light entrance side facing to the base part for directing the first light through the light guide to escape at a light escape side of the light guide,
    wherein the light escape side of the light guide is surrounded by diffusion cover.

2. The downlight apparatus of claim 1, further comprising a driver, wherein the driver controls the light module to emit the first light and the second light separately.

3. The downlight apparatus of claim 2, wherein the light module has a first LED module and a second LED module for emitting the first light and the second light respectively.

4. The downlight apparatus of claim 3, wherein the first LED module and the second LED module emit lights with different optical spectrums.

5. The downlight apparatus of claim 3, wherein the light module further comprises a substrate, the first LED module is disposed at a central portion of the substrate and the second LED module is disposed at a peripheral portion of the substrate.

6. The downlight apparatus of claim 1, wherein the first LED module and the second LED module are mounted on two different substrates, the two different substrates are disposed at different heights with respect to the base part.

7. The downlight apparatus of claim 6, wherein the diffusion cover comprises a peripheral light guide, and the second LED module emits the second light into the peripheral light guide to form the peripheral light.

8. The downlight apparatus of claim 7, wherein both sides of the peripheral light guide emit the peripheral light.

9. The downlight apparatus of claim 1, wherein the light guide is an elongated column.

10. The downlight apparatus of claim 9, wherein the light escape side has a three-dimension shape for producing a corresponding three-dimension luminance effect.

11. The downlight apparatus of claim 9, wherein the diffusion cover defines an inner wall surrounding the elongated column.

12. The downlight apparatus of claim 11, wherein an inner wall of the diffusion cover has a three-dimension surrounding inwardly curve surface.

13. The downlight apparatus of claim 11, wherein the diffusion cover protrudes below the bottom end of the surrounding wall.

14. The downlight apparatus of claim 12, wherein the three-dimension surrounding inwardly curve surface is corresponding to the surrounding wall so as luminance level over the diffusion cover is evenly distributed.

15. The downlight apparatus of claim 14, wherein an interior side of the surrounding wall has reflective material for reflecting light evenly over the diffusion cover.

16. The downlight apparatus of claim 15, wherein luminance difference between any two positions of the diffusion cover is less than 30%.

17. The downlight apparatus of claim 1, wherein there are a plurality of the light guides.

18. The downlight apparatus of claim 1, wherein the plurality of light guides have light escape sides facing to different directions.

19. The downlight apparatus of claim 1, wherein the first light and the second light have different color spectrums.

20. The downlight apparatus of claim 1, wherein the base part has a back structure with two sockets for selectively installing different fixing structures for fixing the downlight apparatus to different stations.

\* \* \* \* \*